Feb. 26, 1963     C. W. PORTER     3,079,547
CONTROL CIRCUIT
Original Filed March 24, 1958
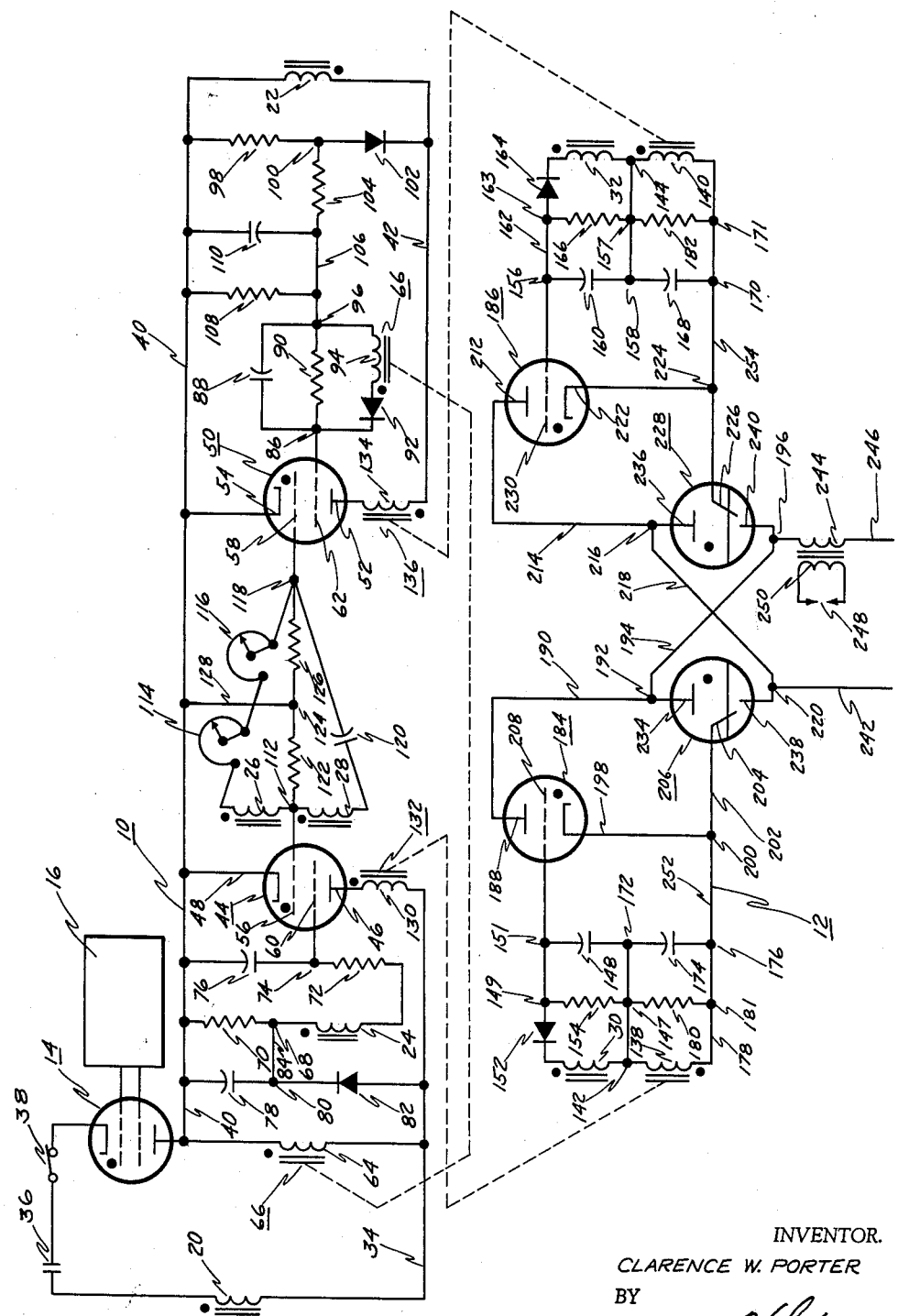
INVENTOR.
CLARENCE W. PORTER
BY
*William H. Schmeling*

United States Patent Office 3,079,547
Patented Feb. 26, 1963

3,079,547
CONTROL CIRCUIT
Clarence W. Porter, Wauwatosa, Wis., assignor to Square D Company, Park Ridge, Ill., a corporation of Michigan
Continuation of application Ser. No. 723,183, Mar. 24, 1958. This application Apr. 8, 1960, Ser. No. 21,006
18 Claims. (Cl. 323—58)

This invention relates to an electrical control system and is more particularly concerned with a control system which will control current flow through high flux density transformers and is a continuation of application Serial No. 723,183, filed March 24, 1958.

The use of high flux density transformers is rapidly increasing, particularly in the field of resistance welders, wherein these units are used to supply welding current to the welding electrodes. While the use of high flux density transformers in resistance welders has resulted in certain advantages, they have also engendered problems which have proved troublesome. One of these problems encountered in these applications is the occurrence of high transient currents which are formed in the transformer primary windings during the initial flow of current therethrough. This problem was the subject of an article entitled "Transient Problems With High-Flux Density Transformers in Welding Applications" which appeared in the March 1956 issue of the Welding Journal. This article by R. C. Mierendorf outlines some of the causes of the transients in the high flux density transformers and clearly shows that the high transient currents which occur are basically the result of the hysteresis characteristics of the iron in the transformer. The article also indicates that the values of these transient currents may exceed by ten times the steady state peak value of the current flow to the windings. Such a transient current, while it does not appear in the secondary windings of the transformer, causes unduly high mechanical stresses on the welding transformer primary windings and may cause premature failure of the ignitrons which control the flow of welding current to the transformer. The article further points out that the starting transients of a welding transformer can be controlled. One of the prior systems for accomplishing the control of starting transients is described and claimed in Mierendorf et al. Patent No. 2,873,421 which issued February 10, 1959, and which is assigned to the assignee of the present application.

The Mierendorf et al. patent teaches that the transients may be minimized if the initial current flow to the welding transformer is delayed during the initial half cycle of the lead tube conduction. In the patent, the delay is accomplished by a relay which is arranged so that the initial current flow to the transformer will occur substantially at an optimum point on the supply voltage wave to produce the minimum magnetizing transients in the welding transformer primary circuit. This optimum point has been found to occur at approximately 85° after the supply voltage wave passes through zero in the direction which will cause the lead tube to become conductive. While the system of the patent has proven to be eminently satisfactory, it has been found susceptible to line voltage variations and relay wear. The system according to the present invention is free of these difficulties.

In modern-day welding apparatus, ignitrons are usually employed to control current flow through the primary winding of the welding transformer. When ignitrons are thus utilized, they are usually connected back-to-back or in inverse-parallel and arranged so that they will be conductive for an even number of half cycles or partial half cycles of the voltage supply wave. This type of control is commonly known as a lead-trail firing arrangement. In U.S. Patent No. 2,783,375, the system for accomplishing the lead-trail firing is set forth in detail. The present invention is also directed to a simplified and more economical arrangement for accomplishing lead-trail firing.

When the system according to the present invention is utilized, the energization of the primary winding of a high flux density transformer is accomplished with a minimum of current transients and without causing saturation of the transformer. This result is realized by causing the lead tube to fire during the first half cycle of its conduction at a predetermined point on the supply voltage wave, i.e., 85°, after the supply voltage wave passes through zero in the direction which will cause the lead tube to be conductive. During the succeeding half cycles the trail and lead tubes are respectively rendered conductive without the aforementioned delay until the conclusion of the welding cycle which terminates with the conduction of the trail tube. In this connection it is to be noted that, if the apparatus includes heat control, the lead tube will initiate conduction at not earlier than 85° on the supply voltage wave regardless of the heat control settings. During the succeeding half cycles the trail tube and lead tube respectively will conduct at any angle adjusted by the heat control, i.e., 30 to 140° after voltage zero. No electro-mechanical relays are required in the present system and line voltage variations are of little effect.

It is an object, therefore, of the present invention to provide a control system having a novel firing circuit for the lead and trail tubes.

A further object is to provide a novel circuit arrangement which will cause the initial firing of an electronic device to be delayed and to initiate conduction of the device at a predetermined point on the supply voltage wave during the initial half cycle conduction of the device.

Another object is to cause the firing of a lead tube of a lead-trail tube combination to be delayed during the initial half cycle of conduction of the lead tube so that the lead tube will fire at the same point on the supply voltage wave during the initial half cycle regardless of variations in the supply voltage.

A still further object is to use the initiating means of a control circuit to vary the point at which a lead tube fires and to condition a trail tube for conduction after the lead tube has fired an initial half cycle.

Another object is to minimize the formation of transient currents in a high density welding transformer. This is accomplished by providing a novel control circuit for the electronic device which causes the firing of a pair of back-to-back ignitrons, which novel control circuit includes a pair of electronic control devices each having a pair of control electrodes wherein a heat control circuit is connected to one of the control electrodes of each tube and an initiating means is used to control the bias on the other electrodes.

Further objects and features of the invention will be readily apparent to those skilled in the art from the specification and appended drawing in which the single figure diagrammatically shows a wiring diagram of a control circuit embodying the features according to the present invention.

In the drawing, the numeral 10 is used to designate a heat control panel and the numeral 12 is used to designate an ignitron panel of a welding apparatus. The heat control panel 10 may be used with any suitable weld timer and in the particular embodiment shown, is arranged to be controlled by the conduction of a firing tube 14 which is basically a part of the weld timer, diagrammatically shown as 16, which preferably is of the type described in application Serial No. 723,182, concurrently filed herewith and assigned to the assignee of the present invention. Normally open relay contacts 36 and the normally closed weld-no-weld switch 38 may also be part of the weld timer.

A transformer has a primary winding, not shown, connected to a suitable alternating current power supply to energize secondary windings 20, 22, 24 26, 28, 30 and 32. One end of the winding 20 is connected to a lead 34 and the other end is connected through a series circuit including the normally open relay contacts 36, the normally closed switch 38 and the tube 14 to a lead 40. The transformer winding 22 has its respective ends connected to the lead 40 and to a lead 42. An electronic device, such as a gas-filled electronic tube 44 which acts as a lead tube, has an anode 46 connected through a primary winding 130 of a transformer 132 to the lead 34 and a cathode 48 directly connected to the lead 40. A second electronic device, such as a gas-filled electronic tube 50 which is designated as a trail tube, has an anode 52 connected through a primary winding 134 of a transformer 136 to the lead 42 and a cathode 54 connected to the lead 40. The tubes 44 and 50 have control grids 56 and 58, respectively, and shield grids 60 and 62, respectively.

A primary winding 64 of a transformer 66 is connected between the leads 40 and 34. The winding 24 has one of its ends connected through a junction 68 and a resistor 70 to the lead 40 and has its other end connected through a resistor 72 to a junction 74 which in turn is connected through a capacitor 76 to the lead 40. The junction 74 is connected to the shield grid 60. A capacitor 78 has one of its terminals connected to the lead 40 and its other terminal connected through a junction 80 and a rectifying diode 82 to the lead 34. The junctions 80 and 68 are interconnected by a lead 84.

The shield grid 62 of the tube 50 is connected through a junction 86 which in turn is connected through a parallel circuit comprising a capacitor 88, a resistor 90, and a series circuit consisting of rectifying diode 92 and a secondary winding 94 of the transformer 66 to a junction 96. A resistor 98 is connected between the lead 40 and a junction 100 which in turn is connected through a rectifying diode 102 to the lead 42. A resistor 104 has one of its ends connected to the junction 100 and its other end connected by a lead 106 to the junction 96. Connected in parallel between the lead 106 and the lead 40 are a resistor 108 and a capacitor 110.

The control grids 56 and 58 are connected to a conventional phase-shift network comprising the secondary windings 26 and 28 which are connected together at a junction 112. The winding 26 is also connected through a pair of series-connected potentiometer resistors 114 and 116 to a junction 118. The transformer winding 28 is also connected through a capacitor 120 to the junction 118. Connected between the junctions 112 and 118 in series are a resistor 122, a junction 124 and a resistor 126. Connected between the junction 124 and the lead 40 is a lead 128. The control grid 56 of the tube 44 is connected to junction 112 while its cathode 48 is connected through the leads 40 and 128 to the junction 124. Likewise, the control grid 58 of the tube 50 is connected to the junction 118 while its cathode 54 is connected through leads 40 and 128 to the junction 124.

The ignitron control panel 12 includes the secondary transformer windings 30 and 32 and a secondary winding 138 of a transformer 132 and a secondary 140 of a transformer 136. The winding 30 and the winding 138 are interconnected at a junction 142 while the windings 32 and 140 are similarly interconnected at a junction 144. Connected between the junction 142 and the other end of the winding 30 is a series circuit comprising a junction 147, a junction 172, a capacitor 148, a junction 151, a junction 149 and a rectifying diode 152. Connected between junctions 147 and 149 is a resistor 154. Connected between the junction 144 and the other end of the winding 32 is a series circuit comprising a junction 157, a junction 158, a capacitor 160, a junction 156, a lead 162, a junction 163, and a rectifying diode 164. Connected between the junctions 157 and 163 in parallel with the capacitor 160 is a resistor 166. The junction 144 is also connected through the junctions 157 and 158 through a capacitor 168 and the junctions 170 and 171 to the other end of winding 140 while the junction 142 is connected through the junctions 147 and 172 and a capacitor 174 to a junction 176 which is connected through a suitable lead 178 to the other end of winding 138. A resistor 180 is connected between the junction 147 and a junction 181 in parallel with the capacitor 174. A resistor 182 is connected in parallel with the capacitor 168 between the junctions 171 and 157.

The ignitron panel also includes a pair of electronic devices or tubes 184 and 186 which are preferably of the gas-filled type, such as thyratrons. The tube 184 has an anode 188 connected through a lead 190 to a junction 192 and a lead 194 to a junction 196. The cathode 198 of the tube 184 is connected through a junction 200 and a lead 202 to an ignitor 204 of a tube 206, preferably an ignitron. The grid 208 of the tube 184 is connected to the junction 151. The anode 212 of the tube 186 is connected through a lead 214 and a junction 216 and a lead 218 to a junction 220 while the cathode 222 of the tube 186 is connected by a suitable lead through a junction 224 to an ignitor 226 of a tube 228, preferably an ignitron. A grid 230 of the thyratron 186 is connected to the junction 156.

The tubes 206 and 228 have respective anodes 234 and 236 which are respectively connected to the junctions 192 and 216 and respective cathodes 238 and 240 which are respectively connected to the junctions 220 and 196. The junction 220 is directly connected to a source of alternating current (not shown) by means of a lead 242 while the junction 196 is connected through a primary winding 244 of a welding transformer to a lead 246 which is connected to another terminal of the alternating current source. Welding electrodes 248 are diagrammatically shown as connected to a secondary winding 250 of the welding transformer. The junctions 200 and 176 are interconnected by a lead 252 and the junctions 224 and 170 are interconnected by a lead 254.

Certain well-known components, such as filter capacitors, current limiting resistors, etc., have been omitted from the circuitry as shown to simplify the description of the present invention. The inclusion of these and other similar elements will be readily apparent to those skilled in the art.

The heat control panel 10 is connected between the firing tube 14 in the weld timer and the firing tubes 184 and 186 on the ignitron panel 12. This panel 10 controls the firing of the ignition tubes 184 and 186 and these tubes in turn control the conduction of the ignitron tubes 206 and 228. In this fashion the heat control devices indirectly control the welding load current.

During standby conditions the cathode 48 of the tube 44 is connected to the anode of the firing tube 14 in the weld timer. The cathode of the tube 14 and the anode 46 of the tube 44 are connected across the secondary winding 20 so that the anodes of the tubes 14 and 44 will be positive when the undotted end of the winding 66 has a positive polarity. The conduction of the tube 44 is therefore dependent upon the conduction of the weld tube 14.

The alternating voltage from the secondary winding 24 is phase-shifted by means of the resistor 72 and the capacitor 76. The junction 74 which is located between resistor 72 and the capacitor 76 is connected to the shield grid 60 of the tube 44. The winding 24 and the capacitor 76 are also electrically tied to the cathode 48 of the tube 44 and through this means the sine wave voltage across capacitor 76 lags the sine wave voltage on anode 46 by a predetermined amount depending on the electrical characteristics of the resistor 72 and the capacitor 76, the amount of lag preferably being 85°.

The resistor 98 loads rectifying diode 102 so that the diode will rectify properly. The resistor 104 and the capacitor 110 constitute an RC filter while the resistor 108 acts as a bleeder for the capacitor 110. One side of the capacitor 110 is connected to the cathode 54 of the tube 50. The other side of capacitor 110 has a negative voltage bias thereon because of the voltage-dividing action of resistor 98 and the diode 102. This negative voltage bias is fed to the shield grid 62 through a charging circuit including the capacitor 88, the resistor 90, and the diode 92 in series with the winding 94. The negative voltage bias on the shield grid 62 normally holds the tube 50 from conducting.

When the weld tube 14 in the timer conducts, an alternating potential of about 100 volts is impressed across the anode 46 and the cathode 48 of the tube 44. The phase-shifted voltage on the shield grid 60 will cause the tube 44 to conduct at exactly 85° on the supply voltage wave. During tube 44 conduction, the diode 82 rectifies the alternating voltage from the winding 20 passing through the tube 14, during the initial half-cycle conduction of the tube 44, thereby causing capacitor 78 to receive a positive charge. The resistor 70 loads the diode 82 and also serves as a bleeder for the capacitor 78. The transformer 66 primary winding 64 conducts a pulse of current when tube 14 conducts. The pulse from the secondary winding 94 of transformer 66 is rectified by the diode 92 and charges capacitor 88 with a positive charge which is greater than the D.C. bias voltage present on the capacitor 110. Resistor 90 is used for a fixed delay in discharging the capacitor 88.

If desired, the control grid 56 of the tube 44 and the control grid 58 of the tube 50 may be directly connected to the cathodes of their respective tubes or they may have a voltage impressed upon them which is phase-shifted. The phase-shifted voltage is adjusted by potentiometers 114 and 116. In practice, two potentiometers, i.e., 114 and 116, are used, so that one of the potentiometers, i.e., 114, can be adjusted to compensate for power factor deviations when the welder is installed and the other potentiometer, i.e., 116, can be used to vary the operation of the welder. The phase-shifting network consists of the transformer windings 26 and 28, the potentiometers 114 and 116 and the capacitor 120. By varying the heat adjuster potentiometer, i.e., 116, the voltage on the control grids 56 and 58 of the tubes 44 and 50 may be phase-shifted so that the tubes 44 and 50 will conduct at any point along the positive anode voltages. The control grid voltage of tube 44 is that voltage appearing across the resistor 122. The control grid voltage of tube 50 is the voltage across the resistor 126. If the potentiometer 116 is set to maximum resistance, the control grid voltages of tubes 44 and 50 reach the critical grid voltage later during the positive half cycle of the anode voltage of tubes 44 and 50. This allows only a small amount of current to flow in the weld transformer. If potentiometers 114 and 116 are set to minimum resistance (100% heat), then the control grid voltage of tubes 44 and 50 will reach the critical grid voltage sooner and allow the welder load current to flow longer during the positive half cycles of anode voltages.

The positive charge on the capacitor 88 is greater than the D.C. bias voltage on the capacitor 110. Therefore, when the tube 14 conducts, a positive voltage is impressed on the shield grid 62. This positive voltage will allow the tube 50 to conduct when anode 52 becomes positive. The charge in capacitor 88 will last for approximately one-half cycle because of the resistor 90.

From the foregoing it is apparent that during the first half cycle of conduction, the phase-shift network including the resistor 72 and the capacitor 76 will cause the firing of tube 44 to be delayed. When the tube 44 is again ready for conduction, the capacitor 78 will have been charged by the previous conduction of the weld tube 14 to render the shield grid 60 positive and therefore unable to take over control of the conduction of tube 44. This means that the conduction of the tube 44 will be delayed for the initial half cycle only. In this connection it is to be noted that the initial conduction of the tube 44 will be delayed only if the heat control setting of the potentiometer 116 is set to cause firing of the tube 44 earlier than 85°. If the potentiometer 116 is set to cause firing of the tube 44 later than 85°, then the initial delay will be cancelled and the tube 44 will be controlled by its grid 56 during the initial as well as succeeding half cycles.

When the tube 44 on the heat panel 10 conducts for the duration of the weld time as determined by the conduction of tube 14, a pulse of voltage is passed through the primary winding 130 of transformer 132. This pulse is coupled through to the grid 208 of the tube 184 and overcomes the steady D.C. bias present on the capacitor 148 which normally holds the tube 184 nonconducting. The leading edge of the pulse is variable depending upon the conduction angle of tube 44 which in turn is governed by the delayed firing circuit and the heat adjuster setting. Thus the tube 44 conducts at the proper firing angle completing the circuit from the lead 246 through the welding transformer primary winding 244, junction 196, lead 194, junction 192, lead 190, tube 184, junction 200, lead 202, the ignitor 204 to cathode 238, junction 220 and lead 242. This conduction causes an arc to form between the ignitor 204 and the cathode 238 of the lead ignitron 206 causing the anode 234 to conduct to the mercury pool cathode 238 thereby shunting the firing circuit. Since the firing circuit conducts load current until the ignitron takes over, this circuit is called "anode firing."

Similarly, when the tube 50 on the heat panel conducts, a pulse voltage is coupled through the transformer 136 to the grid 230 of the tube 186 which overcomes the D.C. bias present on capacitor 160. Thus the tube 186 conducts at the proper firing angle completing the trail circuit from lead 242 through the welding transformer to lead 246.

From the above it is apparent that the conduction of the tube 14 will cause cancellation of hold-off bias on both the lead tube 44 and the trail tube 50. During the initial half cycle of conduction of tube 14, the shield grid 60 of the lead tube 44 has an A.C. bias present thereon which will permit the tube 44 to conduct only at a predetermined point on the voltage wave of its anode supply. After the first half cycle, this A.C. bias is overcome by the charge impressed on capacitor 78 so that the subsequent conduction of the tube 44 after the initial half cycle is controlled by the A.C. bias impressed on the control grid 56 by the phase-shift network.

Also before tube 14 conducts, the bias on the shield grid 62 of tube 50 holds tube 50 from conducting. When the tube 14 conducts, the windings of transformer 66 will cause the capacitor 88 to become charged to overcome the original hold-off bias on the shield grid 62. Therefore on each succeeding half cycle after the conduction of tube 44, trail tube 50 conducts to provide a positive lead-trail tube conduction.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit, the combination comprising; a source providing a sinusoidal voltage wave of periodic positive and negative polarity pulsations of half cycle duration, an electronic tube having a pair of principal electrodes and a pair of control electrodes, a control means in a circuit connecting the principal electrodes to the source, an adjustable phase shift means connected to one of the control electrodes for adjustably rendering the tube to be conductive for a selected portion of the positive half cycles of the voltage wave of the source, a second phase shift means connected to the other control electrode arranged to render the tube conductive only at a particular point on the positive half cycle of the voltage wave of the source, and a bias means energized through the control means and connected to the other control electrode for overcoming the effect of the second mentioned phase shift means immediately after the first half cycle conduction of the tube.

2. In a control circuit, the combination comprising; a pair of electronic tubes each having a pair of principal and a pair of control electrodes, an alternating current source connected to the principal electrodes having a sinusoidal voltage wave, a phase shift means connected to one of the control electrodes of each tube for adjustably controlling the point on the voltage wave of the source at which the tubes are rendered conductive, a means connected with the other control electrode of one of the tubes providing a bias for normally rendering the one tube nonconductive, a phase shift means connected to the other control electrode of the other tube for causing the other tube to be rendered conductive only at a predetermined point during a half cycle of the voltage wave of the source, initiating means for causing the other tube to be conductive, means controlled by the initiating means for overcoming the bias for causing the one tube to be rendered conductive on the succeeding half cycle of the voltage supply wave after the other tube is rendered conductive and means energized through the initiating means and connected with the other control electrode of the other tube arranged to render the other tube responsive to the means connected to the said one electrode after the other tube has conducted during said first half cycle.

3. In a control circuit, the combination comprising; a source of alternating current providing a sinusoidal voltage wave having periodic half cycle pulsations, a pair of electronic tubes each having a pair of principal electrodes and a pair of control electrodes, said source being connected across the principal electrodes of one of the tubes and connected through an open circuit across the principal electrodes of the other tube, means connected to one of the control electrodes of each of the tubes for controlling the point on the voltage wave of the source at which the tubes are rendered conducting, means connected with the other control electrode of the said one tube for normally rendering the tube nonconductive, means connected with the other control electrode of the said one tube for rendering the tube conducting only at a predetermined point on the voltage wave of the source, means for closing the circuit between the other tube and the source for causing the other tube to be rendered conductive at the predetermined point on the voltage wave, and means energized by the circuit closing means and connected with the other control electrode of the said one tube for rendering the one tube conductive on the succeeding half cycle of the voltage wave of the source after the other tube is rendered conductive and means connected to be responsive to the closing of the circuit and connected to the other electrode of the other tube for rendering the tube responsive to the means connected to the one electrode of the other tube after the tube has conducted during the half cycle.

4. In a control circuit, the combination comprising; a source of alternating current providing a sinusoidal voltage wave having periodic half cycle positive pulsations, an electronic tube having a pair of principal electrodes and a pair of control electrodes, said source of alternating current being connected in an open circuit with the principal electrodes of the tube, means for closing the circuit for rendering the tube conductive for passing positive half cycles of current from the source to a load, means connected to one of the electrodes for controlling the point on the voltage wave of the source at which said tube is rendered conductive, means connected with the other electrode for rendering the tube conducting at a predetermined point on the voltage supply wave of the source, and means connected to be responsive to the closing of the circuit by said means and connected to the other electrode for rendering the tube responsive to the means connected to the said one electrode after the tube has conducted during an intial half cycle.

5. In an electric system, the combination comprising; a source of alternating current providing a voltage wave of periodic half cycle positive pulsations, an electronic device having a pair of principal electrodes and a pair of control electrodes, a load, an initiating means, means connecting the source, initiating means and principal electrodes in circuit with the load, means connected to one of the control electrodes for rendering the device conductive for selective portions of the half cycle pulsation, means connected to the other control electrode for controlling the device so the device is rendered conductive only at a predetermined point on the voltage wave of the A.C. source, and means connected with the other control electrode and the initiating means for overcoming the controlling effect of the means connected to the other electrode after the initial half cycle of conduction of the device.

6. In an electric system, the combination comprising; an electric device having a pair of control electrodes, said device having a pair of principal electrodes connected to an alternating current source which provides a sinusoidal voltage wave of periodic half cycle pulsations, means connected to one of the electrodes for adjustably varying the point along the voltage wave of the alternating current source at which the device is rendered conductive, means connected to the other control electrode for normally rendering the device conductive at only one predetermined point along the voltage wave and means connected to the other control electrode for rendering the device conductive at any point along the voltage wave after said device has conducted an initial half cycle of current from the source whereby the conduction of said device after the first half cycle is controlled by said first mentioned means.

7. In a control circuit, the combination comprising; an alternating current source, a pair of conductive electronic devices each having a pair of principal electrodes connected to the alternating current source and a pair of control electrodes for controlling the conduction thereof, means connected to one of the control electrodes of each device for adjustably delaying the conduction of each device, an A.C. bias means connected to the other control electrode of at least one of said devices for controlling the conduction of the said one device, an initiating means actuable for initiating the conduction of the said one device, and a D.C. bias means energizable in response to the actuation of the initiating means for overcoming the effect of the A.C. bias means.

8. In a control circuit, the combination comprising; a lead tube having a pair of control electrodes, a trail tube having a pair of control electrodes, both of said tubes having a pair of principal electrodes connected to a source of alternating current having a voltage wave providing periodic half cycle voltage pulsations, a phase shift means connected to one of the control electrodes of both tubes, a bias means connected to the other electrode of the trail tube normally biasing the tube from conduction, means connected to the other electrode of the lead tube arranged to render the lead tube conductive only at a predetermined point on the voltage wave of an A.C. source for both tubes, means for initiating conduction of the lead tube, and means responsive to the initiating means for overcoming the bias means and rendering the trail tube conductive on the succeeding half cycle of the source voltage wave after the conduction of the lead tube and to cancel the effect of the means connected to the other electrode of the lead tube after the lead tube is conductive during the first half cycle.

9. In a control system, the combination comprising;

an electronic device having a pair of principal electrodes connected in a load circuit to a circuit of alternating current having a voltage wave providing periodic half cycle pulsations, a pair of control electrodes for the device arranged to control the conduction of the device, phase shift means connected to one of the electrodes for adjustably varying the point along a voltage wave of an A.C. source at which the device is rendered conductive for supplying the load, means connected to the other control electrode for rendering the device conductive only at a predetermined point on the voltage supply wave and means responsive to a means for initiating conduction of the device for rendering the means connected to the auxiliary electrode inoperative after the device conducts during the first half cycle.

10. In a control system wherein a pair of electronic devices are arranged to conduct alternate half cycles of a voltage wave of an alternating current and a phase shift network is connected to a control electrode of each device for adjustably varying the conduction of the devices during the half cycles, the combination comprising; an auxiliary electrode in each of the devices arranged to control the conduction of the devices, means connected to the auxiliary electrode of one of the devices for initiating conduction of the device at a predetermined point along the voltage wave of the alternating current, means connected to the auxiliary electrode of the other device for biasing the other device against conduction, and means responsive to the operation of an initiating means for the system for rendering said first and second means inoperative after the first half cycle of conduction of the tubes.

11. In a control system, the combination comprising; a pair of electronic devices each having a pair of control electrodes, each of the devices having a pair of principal electrodes connected to an alternating current source which provides a voltage wave having half cycle periodic pulsations, means connected to one of the control electrodes of each device for causing the devices to be conductive for half cycle or less intervals, means connected to the other control electrode of one of the devices normally biasing the device against conduction, means connected to the other control electrode of the other device for normally rendering the device conductive at a predetermined point on the voltage wave of the source, an initiating device actuable to initiate the conduction of the other device, means energized in response to the actuation of the initiating device and connected with the other control electrode of the other device for causing the other device to be rendered conductive at any point on the voltage supply wave after the other device has conducted one half cycle, and means energized in response to the actuation of the initiating means and coupled with the other control electrode of the one device for causing the one device to be rendered conductive during the cycle following said first half cycle.

12. The combination as set forth in claim 6 wherein the devices are arranged to control the conduction of a pair of ignitrons which are connected in inverse parallel to supply a high flux density transformer.

13. The combination as set forth in claim 6 wherein the devices are arranged to control the conduction of a pair of ignitrons which are connected in inverse parallel to supply a high flux density transformer with alternating current having a voltage wave of periodic alternate half cycle pulsations of positive and negative polarity and wherein the bias means connected to one of the devices is operative only during the conduction of the first positive half cycle pulsation of the device whereby the formation of transient currents in the transformer is substantially minimized.

14. A control system for causing the firing of an electronic device for the first conductive half-cycle to occur at a precise point on an alternating voltage wave different from the point at which firing for the next successive conductive half-cycle occurs, said system comprising an electronic device having a pair of principal electrodes connected across a source of alternating voltage and a control electrode for controlling the firing of said device, a fixed phase-shift means interposed between the source and said control electrode and operative to initiate conduction of said device for the first of a series of successive half-cycles precisely at a predetermined point on the voltage wave of said source, and circuit means including a D.C. bias circuit connected to said phase-shift means and energized during the first half cycle of conduction of said device to disable said phase-shift means and to cause said device to conduct at a different controlled point on the voltage wave for the next and any succeeding half-cycles.

15. In a control circuit for effecting the passage of alternating current to a load including a transformer, electronic devices connected to pass alternate half cycles of alternating current from a source to the load, means for selectively rendering the devices conductive, means independent of current flow in the load for causing the initial half cycle conducting point of the devices to occur at a predetermined point on the voltage wave of the source to provide a minimum transformer magnetizing current transient, said means comprising; an electronic switch having a control electrode, a fixed phase shift circuit connected to the control electrode for causing the switch to be initially rendered conductive at the predetermined point during a selected half cycle of the voltage wave of the source, and a D.C. bias circuit connected to the control electrode for overcoming the effect of the fixed phase shift circuit on the electronic switch after the switch conducts during the first selected half cycle.

16. The combination as set forth in claim 15 wherein the devices are arranged to control the conduction of a pair of ignitrons which are connected in inverse parallel to supply a high flux density transformer.

17. The combination as recited in claim 16 wherein the fixed phase shift circuit causes the devices to phase back only the initial half cycle conducting point of one of said devices to substantially 85° after voltage zero.

18. In a control circuit for effecting the passage of alternating current to a high flux density transformer, the combination comprising; a pair of discharge devices connected in a lead-trail firing arrangement to pass alternate half cycles of alternating current to the transformer primary, means including an electronic device having a pair of principal electrodes connected across a source of alternating voltage and coupled to said devices for initiating the conduction of the lead device, a control electrode for controlling the firing of the electronic device, a fixed phase shift means interposed between the source and said control electrode and operative to initiate conduction of said electronic device for the first of a series of successive half cycles precisely at 85° after voltage zero of the source, and circuit means including a bias circuit connected to said phase shift means and energized from said source during the first half cycle of conduction of said electronic device to disable the phase shift means and cause the electronic device to conduct at a different controlled point on the voltage wave of the source for the next and any succeeding half cycles.

References Cited in the file of this patent

UNITED STATES PATENTS

| 2,092,545 | Alexanderson | Sept. 7, 1937 |
| 2,098,023 | Alexanderson | Nov. 2, 1937 |
| 2,873,421 | Mierendorf et al. | Feb. 10, 1959 |

FOREIGN PATENTS

| 587,104 | Great Britain | Apr. 14, 1947 |